(12) United States Patent
Leboisne

(10) Patent No.: US 6,840,044 B2
(45) Date of Patent: Jan. 11, 2005

(54) MASTER CYLINDER AND PNEUMATIC ACTUATOR DEVICE FOR A BRAKING SYSTEM

(75) Inventor: Cédric Leboisne, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/466,370

(22) PCT Filed: Dec. 12, 2001

(86) PCT No.: PCT/FR01/04062

§ 371 (c)(1),
(2), (4) Date: Jul. 2, 2003

(87) PCT Pub. No.: WO02/053437

PCT Pub. Date: Jul. 11, 2002

(65) Prior Publication Data

US 2004/0055296 A1 Mar. 25, 2004

(30) Foreign Application Priority Data

Jan. 2, 2001 (FR) .......................... 01 00053

(51) Int. Cl.$^7$ ................................................ B60T 11/20
(52) U.S. Cl. ................................................ 60/585
(58) Field of Search ........................ 60/584, 585, 592

(56) References Cited

U.S. PATENT DOCUMENTS

| | | | | |
|---|---|---|---|---|
| 2,625,267 A | * | 1/1953 | Alexander | ............... 60/592 |
| 4,201,056 A | * | 5/1980 | De Martelaere et al. | ...... 60/584 |
| 5,497,864 A | * | 3/1996 | Oien | ............... 60/584 |

* cited by examiner

Primary Examiner—F. Daniel Lopez
(74) Attorney, Agent, or Firm—Leo H McCormick, Jr.; Warren Comstock

(57) ABSTRACT

A master cylinder and booster device for a motor vehicle braking system, in which the master cylinder (10) and the booster (12) are assembled to form a one-piece entity comprising a small reservoir (20) of brake fluid mounted on the master cylinder (10) and connected by a flexible duct (22) to a separate brake fluid reservoir (24) secured temporarily to the entity (10 12) for the purposes of delivering it to a motor vehicle manufacturer.

8 Claims, 3 Drawing Sheets

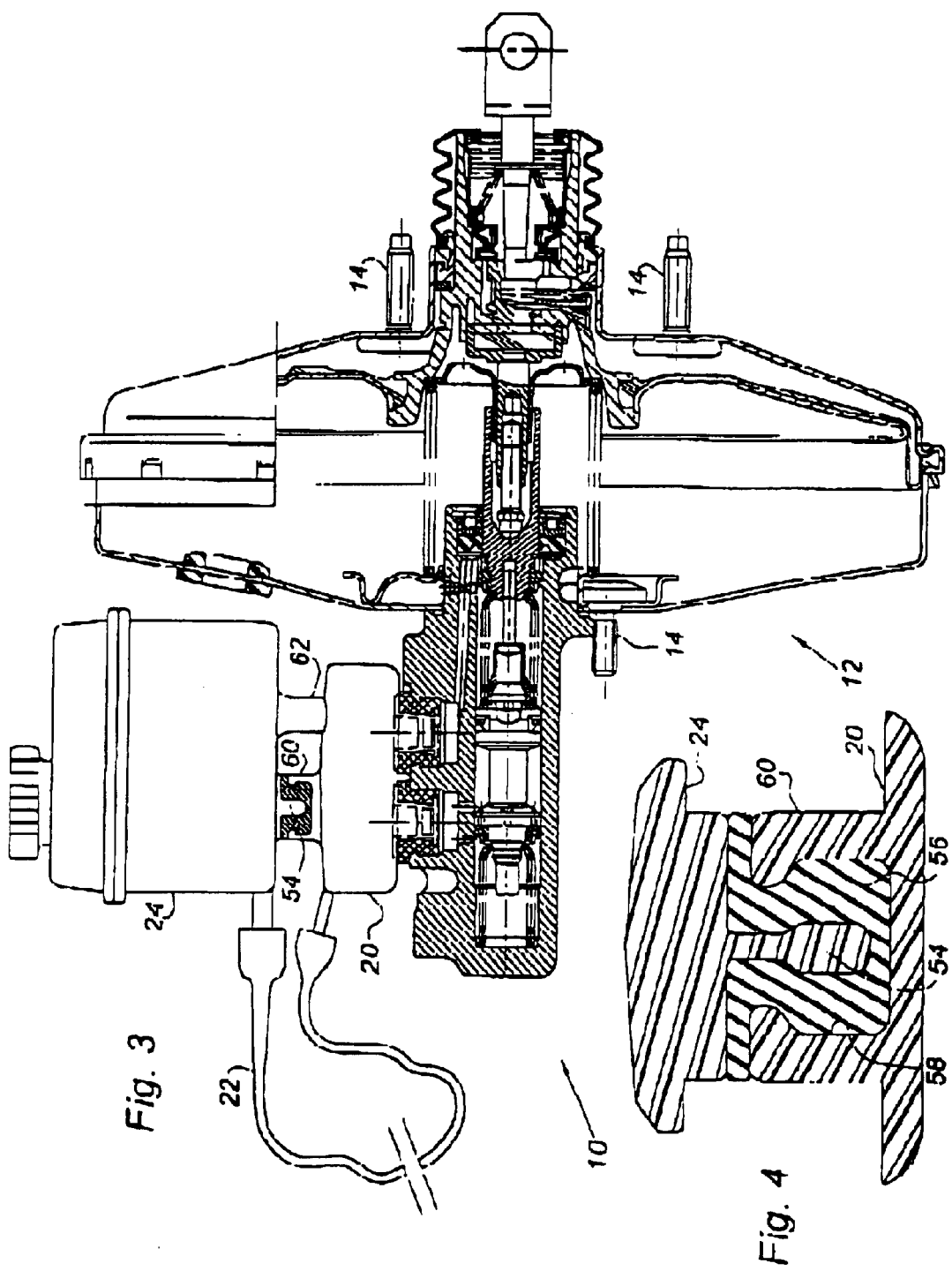

MASTER CYLINDER AND PNEUMATIC ACTUATOR DEVICE FOR A BRAKING SYSTEM

The invention relates to a master cylinder and pneumatic booster device for a motor vehicle braking system.

The master cylinder and the pneumatic brake booster which form part of a motor vehicle braking system, are delivered to the vehicle manufacturer in the form of a one-piece entity.

When the space available in the engine compartment so permits, a one-piece brake fluid reservoir is mounted on the master cylinder and forms part of the one-piece entity delivered to the manufacturer, who thus receives a complete entity that he has merely to mount in the engine compartment.

On the other hand, when the space available in the engine compartment is insufficient, the brake fluid reservoir is in two parts, one part being a small reservoir or "mini reservoir" mounted on the master cylinder and the other being a reservoir of larger volume which is separate from the master cylinder and which has to be secured at a suitable point in the engine compartment and then connected to the mini reservoir by a flexible duct through which the fluid can pass.

In general, the separate reservoir and the entity formed by the master cylinder, the mini reservoir and the pneumatic booster are delivered to the manufacturer by different suppliers, which forces the manufacturer to take control himself of the supplies and stocks of these two components and of their means of connection, and to connect these two components when mounting the braking entity in the vehicle, something which takes longer, is more complicated and more expensive than in the first mentioned scenario where the manufacturer has merely to mount a one-piece entity in an engine compartment.

A particular object of the invention is to avoid these drawbacks.

The subject of the invention is a master cylinder and pneumatic booster device for a motor vehicle braking system, which comprises a two-part brake fluid reservoir which can nonetheless be mounted in a motor vehicle engine compartment as simply and as quickly as if it were a device with a brake fluid reservoir made in just one piece.

To this end, the invention provides a master cylinder and pneumatic booster device, comprising a small reservoir of brake fluid mounted on the master cylinder, characterized in that it also comprises means for temporarily securing a separate brake fluid reservoir.

Thus, according to the invention, the separate reservoir is temporarily secured to the master cylinder and booster device delivered to the motor vehicle manufacturer in such a way that the latter receives a one-piece entity which is secured in the engine compartment of the vehicle, after which he removes the separate reservoir from this entity and secures it at the desired point in the engine compartment of the vehicle.

That avoids the vehicle manufacturer having to control his supplies and stocks of separate reservoirs and also allows the supplier of the one-piece entity to carry out quality control on the separate reservoir that he receives from the relevant manufacturer.

Advantageously, the separate reservoir is, in the entity delivered to the motor manufacturer, connected to the small reservoir by a fluid passage duct, which is the definitive duct connecting the two reservoirs and the length of which has been determined according to the distance separating the two reservoirs in the vehicle engine compartment and to the path that this connecting duct has to take through the engine compartment.

The motor manufacturer is thus relieved of all the problems associated with connecting the two parts of the brake fluid reservoir together.

According to other features of the invention, the means of temporarily securing the separate reservoir are of the clip-fastening or elastic snap-fastening type, or alternatively of the screw-nut type.

Particularly advantageously, at least part of the temporary-securing means is formed of means that already exist on the master cylinder and/or on the booster.

In a first embodiment of the invention, the temporary-securing means comprise first means formed on the pneumatic booster and second means formed on the separate reservoir. In particular, the first means may comprise a sealing ring made of elastically deformable material mounted in an orifice of one wall of the booster to accommodate and retain a finger or the like formed on a wall of the separate reservoir.

Advantageously, this orifice in the wall of the booster has some function other than that of temporarily securing the separate reservoir and is, for example, intended subsequently to take means of connection to a source of partial vacuum.

In another embodiment of the invention, the means of temporarily securing the separate reservoir comprise a lug fixed to the device consisting of the master cylinder and of the booster, and comprising a passage orifice for an end piece firmly attached to the reservoir, and means for retaining this lug on the end piece.

Advantageously, this end piece forms an orifice for filling and emptying the reservoir and takes a shut-off cap that forms the abovementioned means of retaining the said lug.

The latter may itself be secured to the master cylinder and booster device by a screw-nut connection, for example by means of a threaded shank for securing the booster and/or the master cylinder.

In yet another embodiment, the separate reservoir is mounted on the small reservoir via elastic snap-fastening means comprising a finger or stud formed so that it projects on one of the reservoirs and engaged and retained in a ring made of elastically deformable material mounted in a blind hole in the other reservoir.

The invention will be better understood and other characteristics, details and advantages thereof will become more clearly apparent from reading the description which follows, given by way of example with reference to the attached drawings.

FIG. 3 is a schematic view in axial section of another alternative form of embodiment of the device according to the invention; and FIG. 4 is an enlarged schematic view in section of a detail of the device depicted in FIG. 3.

Figure 1:
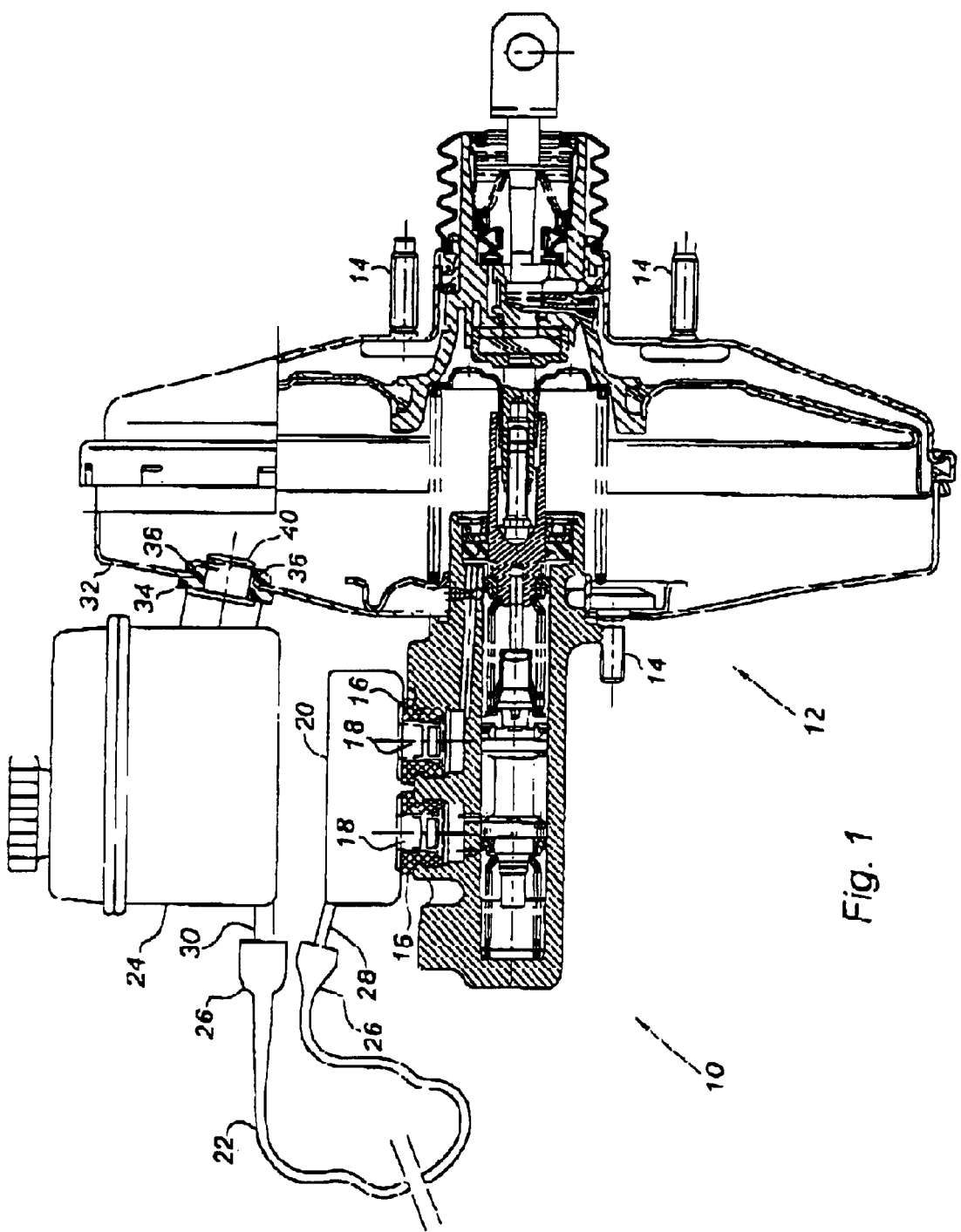
FIG. 1 is a schematic view in axial section of a device according to the invention.

The device depicted in FIG. 1 comprises a tandem master cylinder 10 and a pneumatic brake booster 12 which are assembled to one another in the customary way and which comprise means of securing to a support in a motor vehicle engine compartment, these securing means being, for example, such as screws 14 carried by the casing of the booster 12.

The master cylinder 10 comprises two brake fluid supply ducts opening onto the upper face of the body of the master cylinder and in which rings 16 made of an elastically deformable material are mounted to accommodate and secure tubular end pieces 18 of a mini reservoir 20 of brake fluid, which is thus mounted on the master cylinder by elastic snap-fastening.

This mini reservoir 20 has a small volume so that it can be housed above the master cylinder in the space available in the engine compartment of the vehicle, and is connected by a flexible duct 22 to a separate brake fluid reservoir 24, the duct 22 at its ends having end pieces 26 or other means of connection to rigid end pieces 28, 30 formed respectively on the mini reservoir 20 and on the separate reservoir 24.

This reservoir 24 is intended to be secured at an appropriate place in the engine compartment of the motor vehicle some distance from the entity formed by the master cylinder 10 and the booster 12, the length of the flexible duct 22 being determined according to the distance separating the two reservoirs and according to the path that the flexible duct 22 is to follow through the motor vehicle engine compartment.

As indicated in the foregoing, the reservoir 24 and the entity comprising the master cylinder 10, the booster 12 and the mini reservoir 20 are, in the prior art, delivered to the motor vehicle manufacturer separately, and the latter has to secure the entity 10, 12, 20 in the motor vehicle engine compartment using the screws 14, has to secure the reservoir 24 in the desired location in the engine compartment, and has then to connect the reservoirs 20 and 24 using the flexible duct 22, the end pieces 26 of which are force-fitted onto the end pieces 28, 30 or fixed to these end pieces in some other way.

According to the present invention, the entity 10, 12, 20 and the separate reservoir 24 are delivered to the motor vehicle manufacturer in the form of a one-piece entity by virtue of means for temporarily securing the reservoir 24 to the entity 10, 12, 20.

In the example of FIG. 1, the temporary-securing means comprise first securing means formed on the casing 32 of the booster 12 and second securing means formed on the reservoir 24.

The first securing means comprise a ring 34 made of elastically deformable material such as rubber or the like, mounted in an orifice 36 of the casing 32 and accommodating, by clip-fastening or elastic snap-fastening, a finger 38 formed so that it projects on the reservoir 24.

The finger 38 can be produced as a single piece with the reservoir 24 by moulding, which reservoir is made of a plastic such as polypropylene.

At its free end, the finger 38 ends in a widened head 40, that can be slipped into the ring 34 by elastically deforming the latter and which serves as a means for retaining the finger 38 in the ring 34.

In a particularly advantageous way, the ring 34 and the orifice 36 of the casing 32 of the booster 12 have a prime function, which is to mount means of connection to a source of partial vacuum. The invention therefore uses, for temporarily securing the reservoir 24, means which already exist on the booster 12. In other words, the invention merely entails forming the finger 38 on the reservoir 24, by moulding.

The use of this device is obvious in the light of the foregoing:

the one-piece entity which is supplied to a motor vehicle manufacturer comprises not only the master cylinder 10 and the booster assembled to one another and the mini reservoir 20 mounted on the master cylinder 10, but also the reservoir 24 secured temporarily to the booster 12 and connected to the mini reservoir 20 by the flexible duct 22;

the motor manufacturer receiving this entity, secures it in the engine compartment of the vehicle using the screws 14, then removes the reservoir 24 from the booster 12 simply by pulling on the reservoir 24 to pull the head 40 out of the elastically deformable ring 34, after which is secured the reservoir 24 in the appropriate place in the engine compartment; and next, the means of connection to a source of partial vacuum can be mounted in the ring 34 of the casing 32 of the booster.

Figure 2:
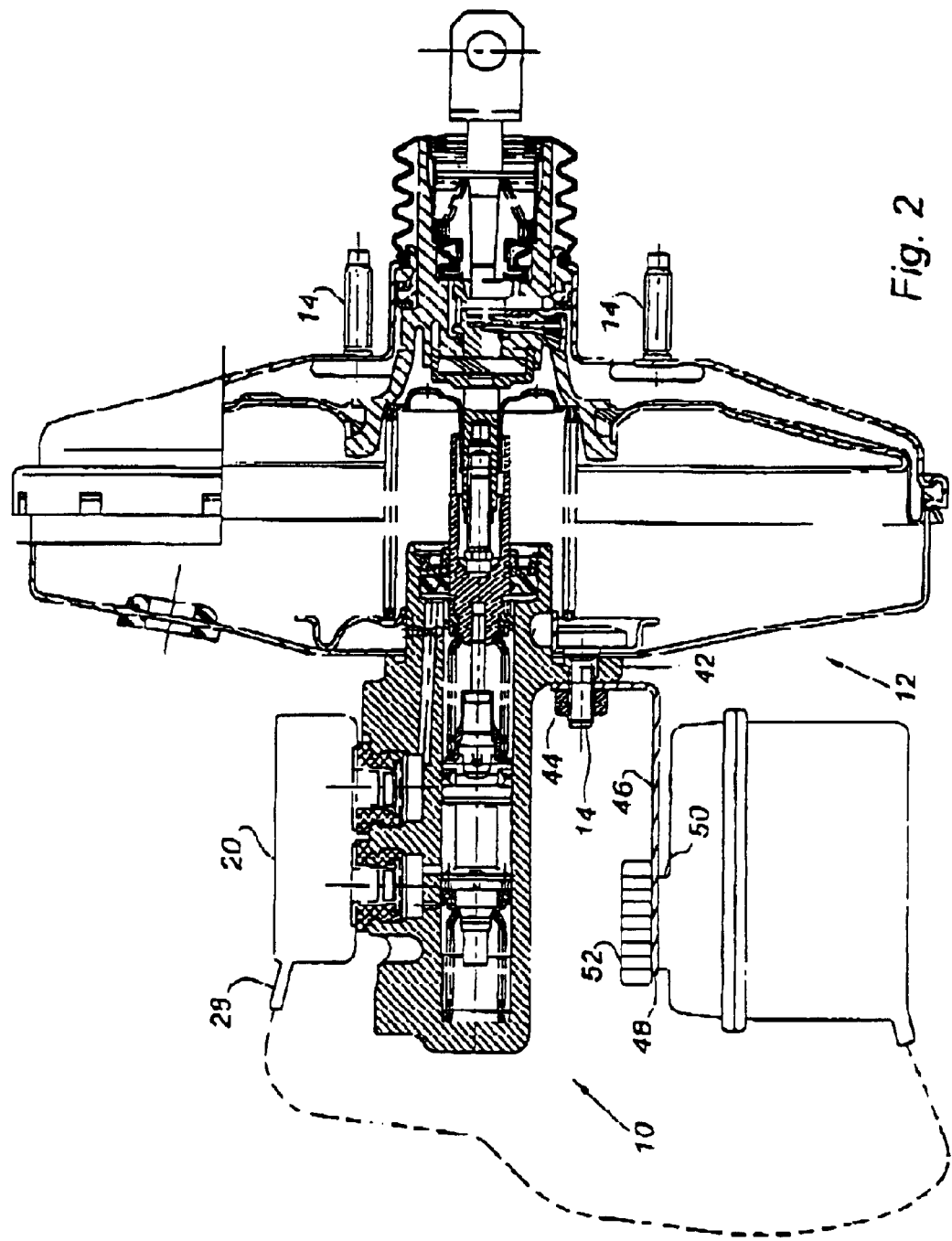
FIG. 2 is a schematic view in axial section of an alternative form of embodiment of this device.

In the alternative form of embodiment depicted in FIG. 2, at least one of the aforementioned screws 14 plays a part in securing the master cylinder 10 and the booster 12 to one another. For that, the screw 14 passes through an orifice of a flange or radial appendage 42 of the master cylinder and takes a screwed-on nut 44.

The means of temporarily securing the reservoir 24 to the master cylinder 10/booster 12 entity comprise a lug 46, for example a bent one, one end of which has an orifice for mounting on the screw 14 and the other end 48 of which has an orifice for mounting on a tubular end piece 50 forming an orifice for filling and emptying the separate reservoir 24. This end piece 50 is externally threaded and takes a screw cap 52 which secures the end 48 of the lug 46 to the reservoir 24. Likewise, the nut 44 holds the other end of the lug 46 secured to the screw 14.

As in the previous embodiment, a flexible duct 22 connects the tubular end pieces 28, 30 of the reservoirs 20 and 24.

Thus, the separate reservoir 24 forms, with the master cylinder 10, the booster 12 and the mini reservoir 20 mounted on the master cylinder 10, a one-piece entity which is delivered to the motor vehicle manufacturer. The latter can, as in the previous embodiment, first of all secure the booster 12 in the motor vehicle engine compartment, using the aforementioned screws 14, then, to free the reservoir 24, unscrew the shut-off cap 52 and remove the end piece 50 from the orifice formed in the corresponding end 48 of the lug 46, it being possible for the latter to remain secured to the aforementioned screw 14 by the tightening nut 44.

Of course, as an alternative, the shut-off cap 52 may be mounted on the end piece 50 by a bayonet system or by clip-fastening.

Likewise, the orifices formed in the ends of the lug 46 for securing it to the screw 14 and to the end piece 50 may be replaced by slots which can be engaged radially over the screw 14 and over the end piece 50.

It will be noted that, as in the previous embodiment, one of the means for temporarily securing the reservoir 24 is a means that already exists on the master cylinder 10 and/or booster 12. One of the advantages of this alternative form of embodiment of the invention is that all that is required is a lug 46 shaped in the desired way for temporarily securing an already existing reservoir 24 to an entity formed of a master cylinder 10 and of a booster 12 which already exist.

This alternative form of the invention is therefore extremely simple and inexpensive to implement.

In another alternative form of embodiment depicted schematically in FIGS. 3 and 4, the separate reservoir 24 is secured temporarily to the mini reservoir 20 by elastic clip-fastening. For that, a wall, for example the end wall of the reservoir 24, has a projecting finger or stud 54 moulded into it, which stud or finger is engaged in a ring 56 made of elastically deformable material mounted in a blind orifice 58 of a wall, for example a top wall, of the mini reservoir 20.

As a preference, this blind orifice 58 is formed by the internal volume of a cylindrical stud 60 formed so that it projects on the upper wall of the mini reservoir 20.

If appropriate, a support stud 62 may be formed so that it projects on the end wall of the reservoir 24, parallel to the aforementioned stud 54 and may come to rest on the upper wall of the mini reservoir 20 to offer the reservoir 24 better support while it is temporarily secured to the mini reservoir 20.

This alternative form of embodiment is used in the same way as already described, by first of all securing the master cylinder 10—booster 12 entity into the engine compartment using the screws 14, then by separating the reservoir 24 from the mini reservoir 20 and securing it at the desired location in the engine compartment.

It will be noted that the alternative form of embodiment in FIGS. 3 and 4 can be implemented simply and inexpensively thanks to a minor modification to the reservoirs 20 and 24.

I claim:

1. A master cylinder and pneumatic booster device for a motor vehicle braking system having a small reservoir (20) of brake fluid mounted on the master cylinder (10), characterized by a second brake fluid reservoir (24) permanently connected to said small reservoir (20) and temporarily secured to said booster (12) through first means (34,36) formed on the booster (12) and second means formed on the separate reservoir (24).

2. The device according to claim 1, characterized in that the first means (34,36) comprise a ring (34) made of elastically deformable material mounted in an orifice (36) on a wall of the booster (12) to accommodate and retain a finger (38) that projects from a wall of the separate reservoir (24).

3. The device according to claim 2 characterized in that said first means (34,36) subsequently receive means to connect a source of partial vacuum to the booster (12).

4. The device according to claim 2, characterized in that said finger is (38) formed integrally with the separate reservoir (24) by moulding.

5. The device according to claim 1, further characterized in that said temporary-securing means comprise a lug (46) fixed to the master cylinder (10) and the booster (12), and comprising a passage orifice for an end piece (50) firmly attached to the separate reservoir (24), and means (52) for retaining the lug (46) on the end piece (50).

6. The device according to claim 5, characterized in that said end piece (50) forms an orifice for filling and emptying the separate reservoir (24) an takes a shut-off cap (52) that forms the means for retaining the lug (46).

7. The device according to claim 5, characterized in that said lug (46) comprises means mounted on a screw (14) for securing the booster (12) with the master cylinder (10).

8. A master cylinder and pneumatic booster device for a motor vehicle braking system, comprising a small reservoir (20) of brake fluid mounted on a master cylinder (10), characterized by means for permanently connecting a separate brake fluid reservoir (24) to said small reservoir (20) by a fluid duct (22) and temporarily connecting said separate brake fluid reservoir (24) to said small reservoir (20) by way of elastic snap-fastening means comprising a finger (54) that projects from one of said small reservoir (20) or separate reservoir (24) and engages and is retained by a ring (56) made of an elastically deformable material mounted in a blind hole (58) in a wall of the other of said small reservoir (20) or separate reservoir (24).

* * * * *